United States Patent
Lee et al.

(10) Patent No.: US 11,487,378 B2
(45) Date of Patent: Nov. 1, 2022

(54) ELECTRONIC DEVICE

(71) Applicant: Samsung Display Co., Ltd., Yongin-si (KR)

(72) Inventors: Choonhyop Lee, Anyang-si (KR); Kangwon Lee, Seoul (KR); Sangchul Lee, Yongin-si (KR); Seunghwan Chung, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 98 days.

(21) Appl. No.: 17/078,992

(22) Filed: Oct. 23, 2020

(65) Prior Publication Data

US 2021/0042004 A1 Feb. 11, 2021

Related U.S. Application Data

(63) Continuation of application No. 16/680,301, filed on Nov. 11, 2019, now Pat. No. 10,817,101.

(30) Foreign Application Priority Data

Dec. 19, 2018 (KR) .................. 10-2018-0165491

(51) Int. Cl.
*G06F 1/16* (2006.01)
*H05K 5/00* (2006.01)
(Continued)

(52) U.S. Cl.
CPC .......... *G06F 3/04142* (2019.05); *G01L 1/146* (2013.01); *G06F 3/0445* (2019.05); *G06F 2203/04105* (2013.01)

(58) Field of Classification Search
CPC .. G06F 3/04142; G06F 3/0445; G06F 3/0443; G06F 3/04144; G06F 3/0414;
(Continued)

(56) References Cited

U.S. PATENT DOCUMENTS

D847,128 S * 4/2019 Kim .................. D14/138 G
10,719,160 B2 * 7/2020 Lee .................. G06F 3/045
(Continued)

FOREIGN PATENT DOCUMENTS

KR   10-2016-0150070     12/2016
KR      10-1719208       3/2017
(Continued)

OTHER PUBLICATIONS

Notice of Allowance dated Jun. 26, 2020, in U.S. Appl. No. 16/680,301.

*Primary Examiner* — Anthony M Haughton
(74) *Attorney, Agent, or Firm* — H.C. Park & Associates, PLC

(57) ABSTRACT

An electronic device includes a window, a display module, a pressure sensor, and a bracket. The window includes a flat area and a curved area. The display module is disposed on a lower surface of the window to overlap with the flat area and the curved area. The pressure sensor is disposed on a lower surface of the display module to overlap with the curved area. The bracket is disposed on the lower surface of the display module and coupled to at least one of the window and the display module. The pressure sensor is disposed between the window and the bracket. The lower surface of the window and the lower surface of the display module face the same direction.

21 Claims, 19 Drawing Sheets

(51) Int. Cl.
*H05K 7/00* (2006.01)
*G06F 3/041* (2006.01)
*G06F 3/044* (2006.01)
*G01L 1/14* (2006.01)

(58) Field of Classification Search
CPC ...... G06F 3/041; G06F 1/1601; G06F 1/1613; G06F 1/1626; G06F 1/1633; G06F 1/1652; G06F 1/1694; G06F 1/1692; G06F 1/1684; G06F 1/1643; G01L 1/146
See application file for complete search history.

(56) References Cited

U.S. PATENT DOCUMENTS

| | | | |
|---|---|---|---|
| 10,761,627 B2* | 9/2020 | Kim | G06F 1/1637 |
| 2006/0238517 A1 | 10/2006 | King et al. | |
| 2014/0253477 A1 | 9/2014 | Shim et al. | |
| 2015/0324056 A1 | 11/2015 | Sato | |
| 2015/0331451 A1 | 11/2015 | Shin et al. | |
| 2016/0103544 A1 | 4/2016 | Filiz et al. | |
| 2017/0336899 A1* | 11/2017 | Szeto | G06F 3/04883 |
| 2018/0143669 A1* | 5/2018 | Bok | G06F 1/1643 |
| 2018/0150153 A1 | 5/2018 | Yoon et al. | |
| 2018/0166507 A1* | 6/2018 | Hwang | H01L 27/3272 |
| 2018/0181163 A1* | 6/2018 | Shin | G06F 1/1626 |
| 2018/0188874 A1* | 7/2018 | Cho | G01L 1/20 |
| 2018/0224963 A1* | 8/2018 | Lee | G06F 3/017 |
| 2018/0364760 A1* | 12/2018 | Ahn | G06F 1/1643 |
| 2019/0004651 A1* | 1/2019 | Hong | G06F 3/0445 |
| 2021/0294443 A1* | 9/2021 | Kim | G06F 3/0447 |

FOREIGN PATENT DOCUMENTS

| | | |
|---|---|---|
| KR | 10-2018-0057796 | 5/2018 |
| KR | 10-1865303 | 6/2018 |

* cited by examiner

ELECTRONIC DEVICE

CROSS-REFERENCE TO RELATED APPLICATION

This application is a Continuation of U.S. patent application Ser. No. 16/680,301, filed on Nov. 11, 2019, issued as U.S. Pat. No. 10,817,101, and claims priority and the benefit of Korean Patent Application No. 10-2018-0165491, filed on Dec. 19, 2018, which are hereby incorporated by reference for all purposes as if fully set forth herein.

BACKGROUND

Field

Exemplary embodiments of the invention relate generally to an electronic device, and more specifically, to an electronic device having an input sensor.

Discussion of the Background

Electronic devices, such as a smartphone, a tablet computer, a notebook computer, and a smart television set, have been developed. The electronic devices include a display device to provide information. The electronic devices further include various electronic modules in addition to the display device.

The electronic devices are manufactured by assembling the display device and the electronic modules. In this case, the electronic modules are arranged organically using an outer case of the electronic device and a bracket. The display device includes a display panel and electronic components coupled to the display panel.

The above information disclosed in this Background section is only for understanding of the background of the inventive concepts, and, therefore, it may contain information that does not constitute prior art.

SUMMARY

Devices constructed according to exemplary embodiments of the invention are capable of providing an electronic device having an improved sensitivity with respect to an external pressure.

Additional features of the inventive concepts will be set forth in the description which follows, and in part will be apparent from the description, or may be learned by practice of the inventive concepts.

According to one or more exemplary embodiments of the invention, an electronic device includes a window, a display module, a pressure sensor, and a bracket. The window includes a flat area and a curved area. The display module is disposed on a lower surface of the window to overlap with the flat area and the curved area. The pressure sensor is disposed on a lower surface of the display module to overlap with the flat area and the curved area. The bracket is disposed on the lower surface of the display module and coupled to at least one of the window and the display module. The pressure sensor is spaced apart from an upper surface of the bracket. The lower surface of the window and the lower surface of the display module face the same direction.

The electronic device may further include an adhesive tape that overlaps with the curved area, the adhesive tape coupling the bracket and the display module to each other.

The pressure sensor may be disposed more adjacent to a center of the window than the adhesive tape.

The pressure sensor may overlap with at least a portion of the curved area, overlaps with at least a portion of the flat area, and overlaps with at least a portion of the display module, and the pressure sensor may be spaced apart from the adhesive tape in a plan view.

The display module may include an optical film, an input sensor disposed under the optical film, a display panel disposed under the input sensor, and a protective panel disposed under the display panel, and the adhesive tape may be coupled to the protective panel.

A concave portion may be defined in the bracket corresponding to the pressure sensor.

The electronic device may further include an adhesive tape that overlaps with the curved area, the adhesive tape coupling the bracket and the display module to each other, and the adhesive tape may have a thickness smaller than a thickness of the pressure sensor.

The pressure sensor may include a first base layer, a second base layer defining a gap with the first base layer, a first electrode disposed on an inner surface of the first base layer or an inner surface of the second base layer, a second electrode disposed on the inner surface of the first base layer or the inner surface of the second base layer, and a sensing layer including a base resin and a conductive particle mixed with the base resin, wherein the inner surface of the first base layer and the inner surface of the second base layer may face each other.

The pressure sensor may include a first electrode disposed in each of a first pressure sensing area, a second pressure sensing area, and a temperature compensation area disposed between the first pressure sensing area and the second pressure sensing area, a second electrode disposed in each of the first pressure sensing area, the second pressure sensing area, and the temperature compensation area, and a sensing layer disposed in each of the first pressure sensing area and the second pressure sensing area to be spaced apart from at least one of the first electrode and the second electrode and not disposed in the temperature compensation area.

The electronic device may further include a sub-sensing layer that may be disposed in each of the first pressure sensing area, the second pressure sensing area, and the temperature compensation area, the sub-sensing layer contacting the first electrode and the second electrode.

According to one or more exemplary embodiments of the invention, an electronic device may include a window, a display module, a pressure sensor, and a support layer. The window may include a flat area and a peripheral area disposed outside the flat area. The display module is disposed on a lower surface of the window to overlap with the flat area and the peripheral area. The pressure sensor is disposed on a lower surface of the display module to overlap with at least the peripheral area. The support layer is disposed on a lower surface of the pressure sensor and may have a Young's modulus greater than the pressure sensor. The lower surface of the window, the lower surface of the display module, and the lower surface of the pressure sensor face the same direction The electronic device may further include a bracket disposed on a lower surface of the display module and coupled to at least one of the window and the display module, and the support layer may be spaced apart from an upper surface of the bracket.

The electronic device may further include an adhesive tape that overlaps with the peripheral area, the adhesive tape coupling the bracket and the display module to each other.

A concave portion may be defined in the bracket corresponding to the support layer.

The support layer may be inserted into the concave portion.

The peripheral area may include a curved area extending from the flat area and a side area extending from the curved area, and the pressure sensor may be disposed in at least the side area.

The pressure sensor may include a first base layer, a second base layer defining a gap with the first base layer, a first electrode disposed on an inner surface of the first base layer or an inner surface of the second base layer, a second electrode disposed on the inner surface of the first base layer or the inner surface of the second base layer, and a sensing layer including a quantum tunneling composite, wherein the inner surface of the first base layer and the inner surface of the second base layer may face each other.

The support layer may have a Young's modulus greater than the first base layer.

The first base layer may include a single polymer film.

The support layer may include a plurality of stacked prepreg layers.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1A:
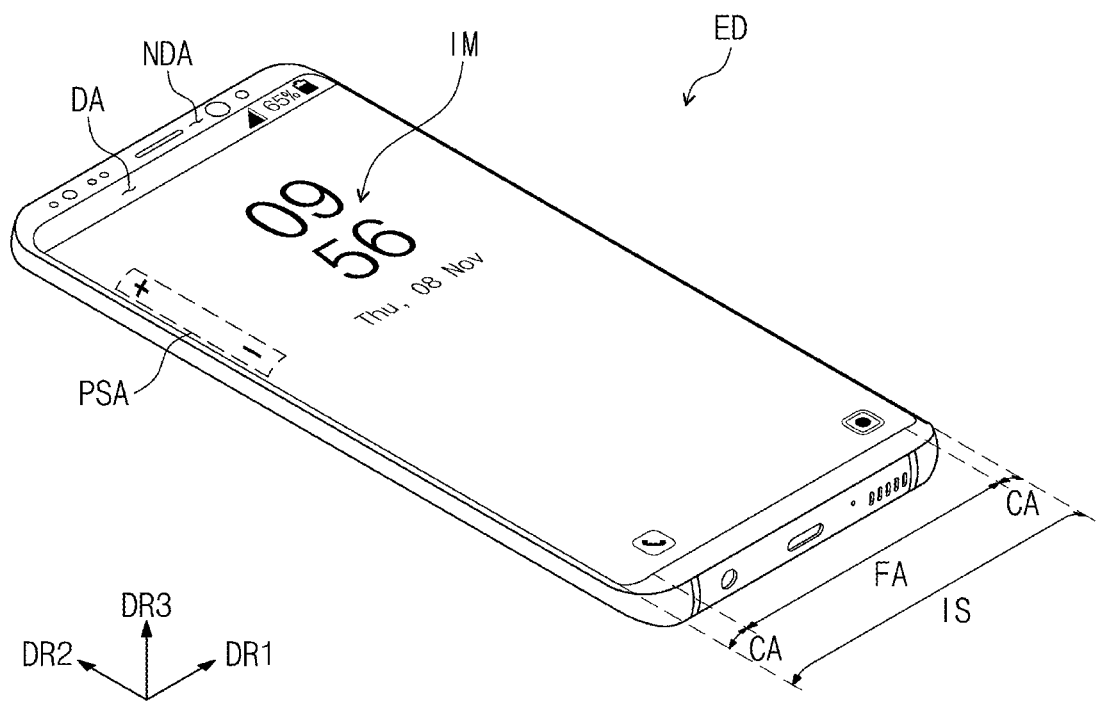
FIG. 1A is a perspective view showing an electronic device according to an exemplary embodiment of the present disclosure.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the x, y, and z-axes, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 1B:
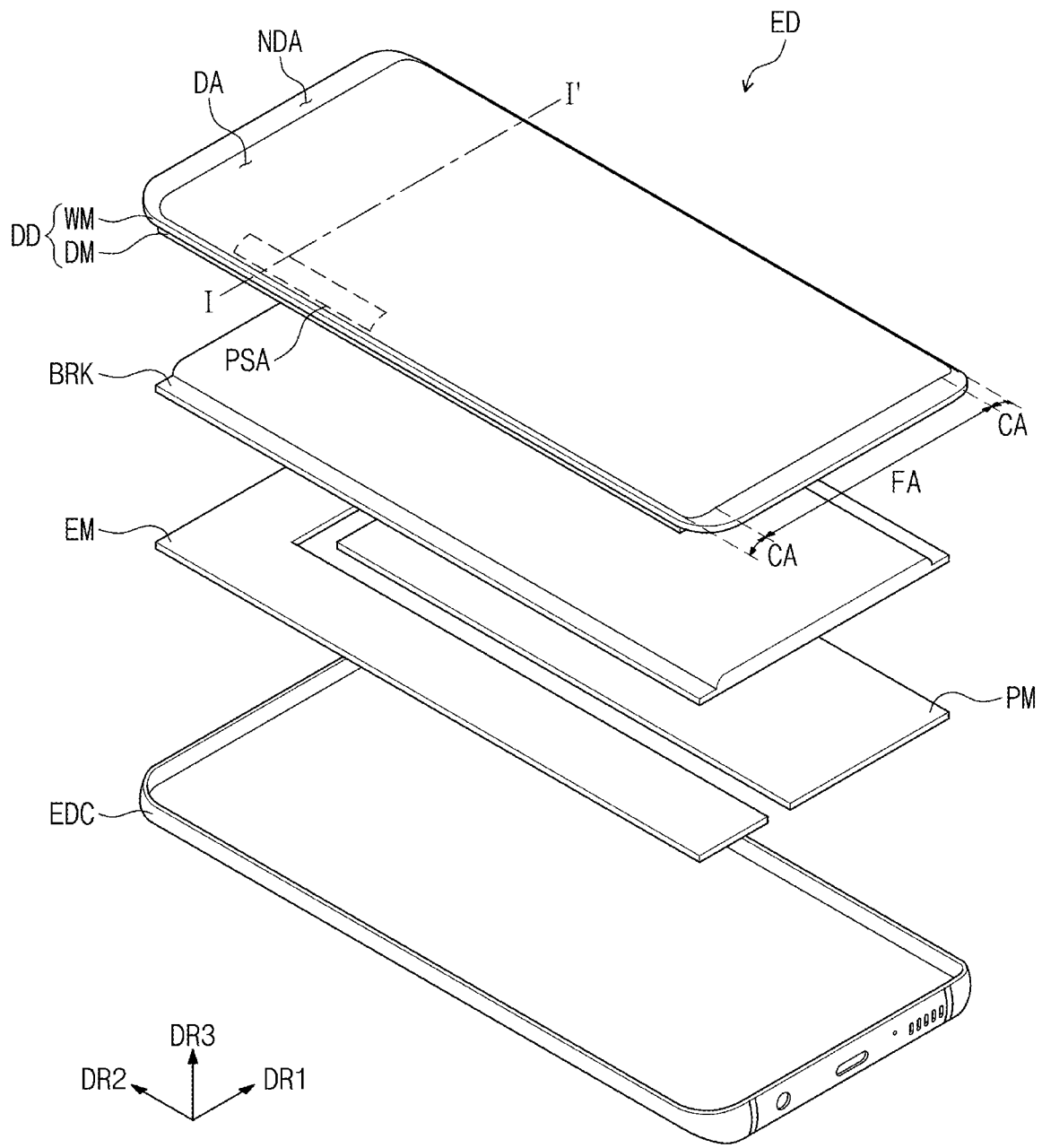
FIG. 1B is an exploded perspective view showing an electronic device according to an exemplary embodiment of the present disclosure.
Figure 2:
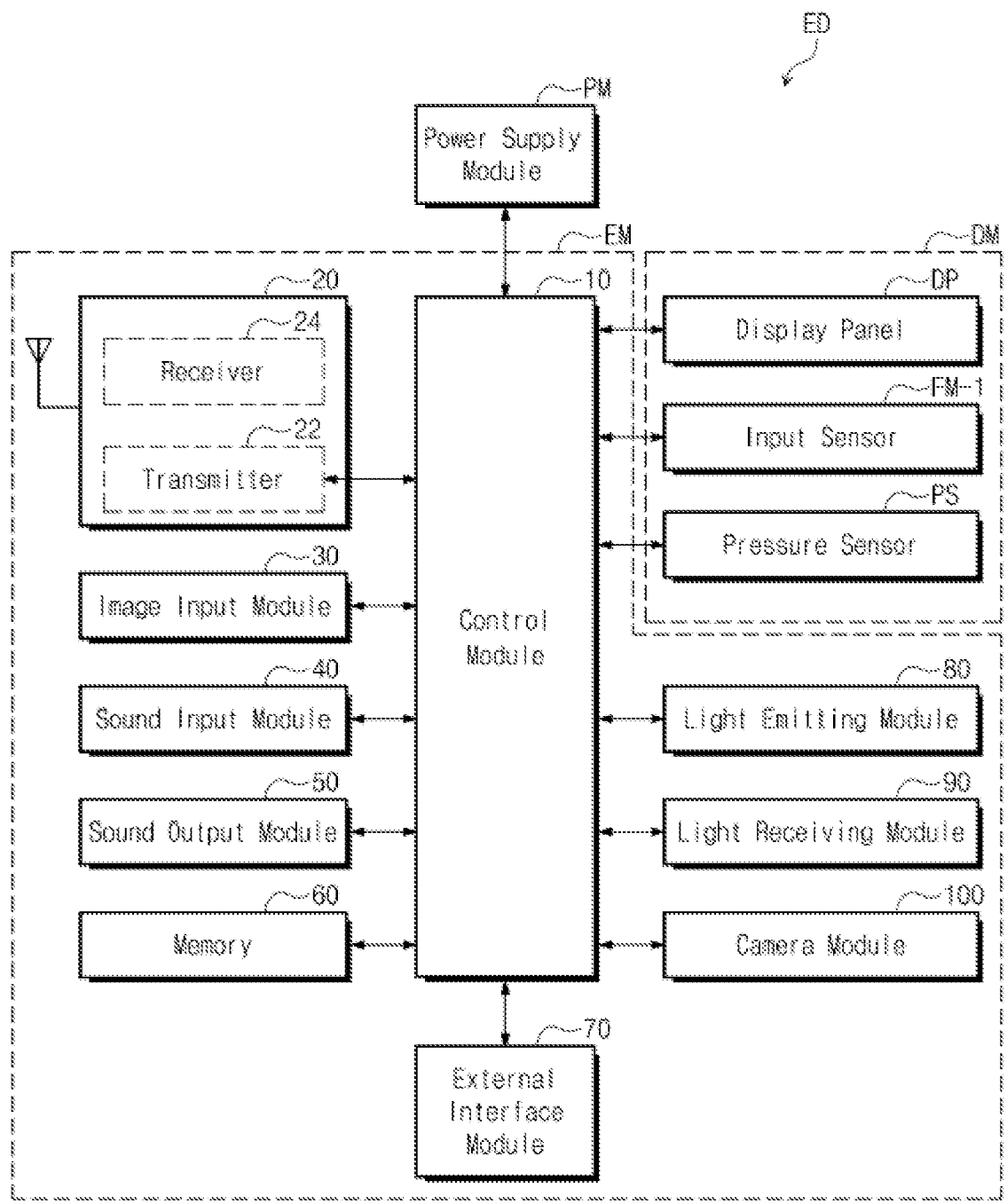
FIG. 2 is a block diagram showing an electronic device according to an exemplary embodiment of the present disclosure.

FIG. 1A is a perspective view showing an electronic device ED according to an exemplary embodiment of the present disclosure. FIG. 1B is an exploded perspective view showing the electronic device ED according to an exemplary embodiment of the present disclosure. FIG. 2 is a block diagram showing the electronic device ED according to an exemplary embodiment of the present disclosure.

In the exemplary embodiments, a smartphone is shown as a representative example of the electronic device ED. However, the electronic device ED should not be limited to the smartphone. In an exemplary embodiment of the present disclosure, the electronic device ED may be a tablet computer, a notebook computer, a smartwatch, or a smart television set.

Referring to FIG. 1A, the electronic device ED includes a display area DA and a non-display area NDA disposed adjacent to the display area DA when viewed in a front view. The non-display area NDA surrounds the display area DA. In the exemplary embodiment of the present disclosure, the non-display area NDA may be disposed only in two areas facing each other in a first directional axis DR1 or only in two areas facing each other in a second directional axis DR2.

A portion of the display area DA may be defined as a pressure sensing area PSA. The pressure sensing area PSA may sense a pressure applied thereto from a front surface of the electronic device ED.

A display surface IS through which an image IM is displayed may include a flat area FA and a curved area CA. A window WM described later may provide the display surface IS. The flat area FA is substantially parallel to a surface defined by the first directional axis DR1 and the second directional axis DR2. In the exemplary embodiments, the display surface IS has a structure in which the curved area CA is disposed at both sides of the flat area FA in a first direction DR1.

A third directional axis DR3 indicates a normal line direction of the display surface IS, i.e., a thickness direction of the electronic device ED. Front (or upper, or first) and rear (or lower, or second) surfaces of each member are defined to be distinguished from each other with respect to the direction in which the image IM is displayed. However, directions indicated by the first, second, and third directional axes DR1, DR2, and DR3 are relative to each other and may be changed to other directions. Hereinafter, first, second, and third directions respectively correspond to directions indicated by the first, second, and third directional axes DR1, DR2, and DR3 and are assigned with the same reference numerals as the first, second, and third directional axes DR1, DR2, and DR3.

Referring to FIGS. 1A and 1B, the electronic device ED includes a display device DD, an electronic module EM, a power supply module PM, a bracket BRK, and an outer case EDC. The configurations of the components are simply shown in FIGS. 1A and 1B.

The display device DD includes the window WM and a display module DM. The window WM provides the display surface IS of the electronic device ED. The display module DM is disposed on a rear surface of the window WM and generates an image. In addition, the display module DM senses a user's input, e.g., a user's touch/a stylus pen's hovering. The display module DM is electrically connected to the electronic module EM via a flexible circuit is board or a connector.

In the exemplary embodiments, each of the window WM and the display module DM includes the flat area FA and two curved areas CA extending from the flat area FA and facing each other in the first direction DR1. However, the shape of the window WM and the display module DM should not be limited thereto or thereby.

The power supply module PM supplies a power source necessary for an overall operation of the electronic device ED. The power supply module PM may include a normal battery module.

The bracket BRK is coupled to the display device DD and/or the outer case EDC to divide an inner space of the electronic device ED. The bracket BRK may be a support member disposed on a lower surface of the display module DM and coupled to at least one of the window WM and the display module DM.

The bracket BRK provides a space in which other components are arranged. In addition, the bracket BRK supports the display device DD so that the display device DD is fixed without shaking. A coupling recess corresponding to the shape of the electronic module EM is defined in the bracket BRK such that the electronic module EM is fixed. The bracket BRK includes a metal or plastic member. In the exemplary embodiments, one bracket BRK is shown as a representative example, however, the electronic device ED may include a plurality of brackets BRK.

The outer case EDC is coupled to the bracket BRK and/or the display device DD. The outer case EDC provides an exterior of the electronic device ED. In the exemplary embodiments, the outer case EDC formed in one body is shown as a representative example, however, the outer case EDC may include a plurality of bodies assembled with each other. The outer case EDC may include a plurality of frames and/or plates formed of a glass, plastic, or metal material.

The electronic module EM includes a mother board and various functional modules mounted on the mother board to operate the electronic device ED. The mother board is electrically connected to the display device DD via a normal connector. Here, the mother board may include a rigid circuit board.

Referring to FIG. 2, the electronic module EM may include a control module 10, a wireless communication module 20, an image input module 30, a sound input module 40, a sound output module 50, a memory 60, an external interface 70, a light emitting module 80, a light receiving module 90, and a camera module 100. Some modules among the modules may be electrically connected to the mother board through a flexible circuit board or a connector without being mounted on the mother board.

The control module 10 controls an overall operation of the electronic device ED. The control module 10 may be, but not limited to, a microprocessor. For example, the control module 10 activates or deactivates the display device DD. The control module 10 controls the image input module 30, the sound input module 40, and the sound output module 50 based on the user's input signal provided from the display device DD.

The wireless communication module 20 may transmit/receive a wireless signal to/from other terminals using a Bluetooth or WiFi link. The wireless communication module 20 may transmit/receive a voice signal using a general communication line. The wireless communication module 20 may include a transmitter 22 that modulates a signal to be transmitted and transmits the modulated signal and a receiver 24 that demodulates the signal applied thereto.

The image input module 30 processes an image signal and converts the image signal into image data that may be displayed through the display device DD. The sound input module 40 receives an external sound signal through a microphone in a record mode or a voice recognition mode and converts the external sound signal to electrical voice data. The sound output module 50 converts the sound data provided from the wireless communication module 20 or the sound data stored in the memory 60 and outputs the converted sound data to the outside.

The external interface 70 serves as an interface between the control module 10 and external devices, such as an external charger, a wired/wireless data port, a card socket (e.g., a memory card and a SIM/UIM card), etc.

The light emitting module 80 generates a light and outputs the light. The light emitting module 80 may emit an infrared ray. The light emitting module 80 may include an LED element. The light receiving module 90 may sense the infrared ray. The light receiving module 90 may be activated when the infrared ray having a predetermined level or higher is sensed. The light receiving module 90 may include a complementary metal oxide semiconductor (CMOS). The infrared ray generated by and output from the light emitting module 80 may be reflected by an external object, e.g., a user's finger or face, and the reflected infrared ray may be incident into the light receiving module 90. The light emitting module 80 and the light receiving module 90 may be provided in plural number depending on use. The camera module 100 takes an image of an external object. The camera module 100 may be provided in plural number depending on the use and a position of the camera module 100 mounted on the electronic device ED.

The display module DM includes a display panel DP, an input sensor FM-1, and a pressure sensor PS. The display panel DP should not be particularly limited and may be a light emitting type display panel, such as an organic light emitting display panel or a quantum dot light emitting display panel.

The input sensor FM-1 obtains coordinate information on an external input. The input sensor FM-1 may sense various types of inputs provided from outside the electronic device ED. For example, the input sensor FM-1 may sense an input caused by the user's body and may sense various types of external inputs, such as light, heat, or pressure. In addition, the input sensor FM-1 may sense not only an input that comes into contact with a sensing surface but also an input that occurs near the sensing surface.

The input sensor FM-1 may be an electrostatic capacitive type sensing panel or an electromagnetic induction type sensing panel. The sensing panel may include a base layer, sensor electrodes, and signal lines connected to the sensor electrodes.

The pressure sensor PS senses an intensity of the external input, i.e., a pressure. The pressure sensor PS measures a resistance, current, or capacitance that varies depending on the pressure applied thereto from the outside.

Figure 3A:
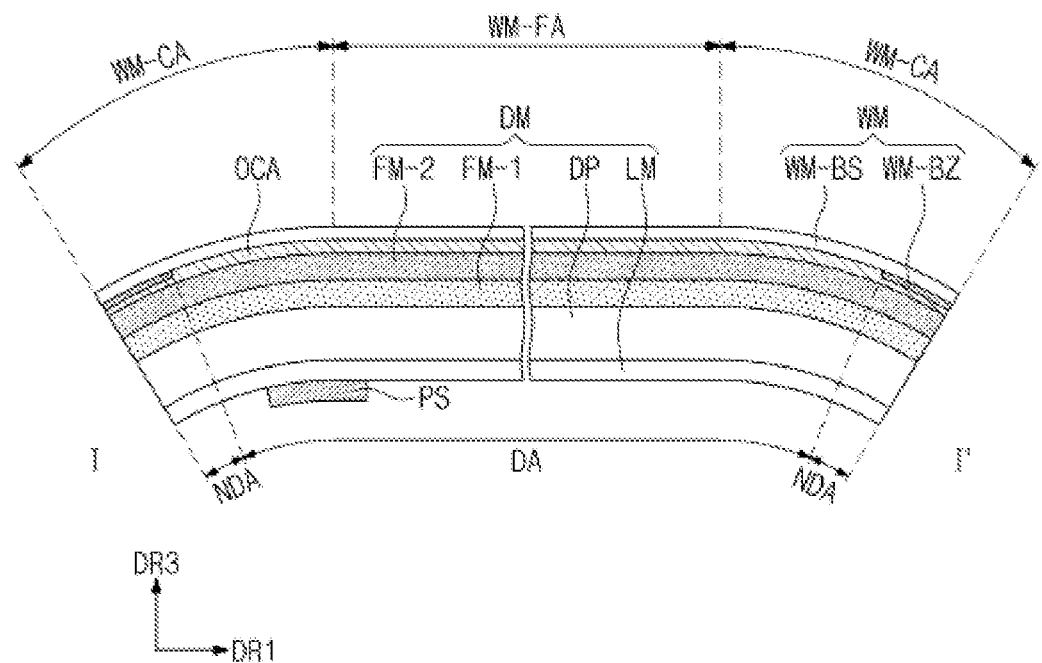
FIGS. 3A and 3B are cross-sectional views showing a display device according to an exemplary embodiment of the present disclosure.
Figure 3B:
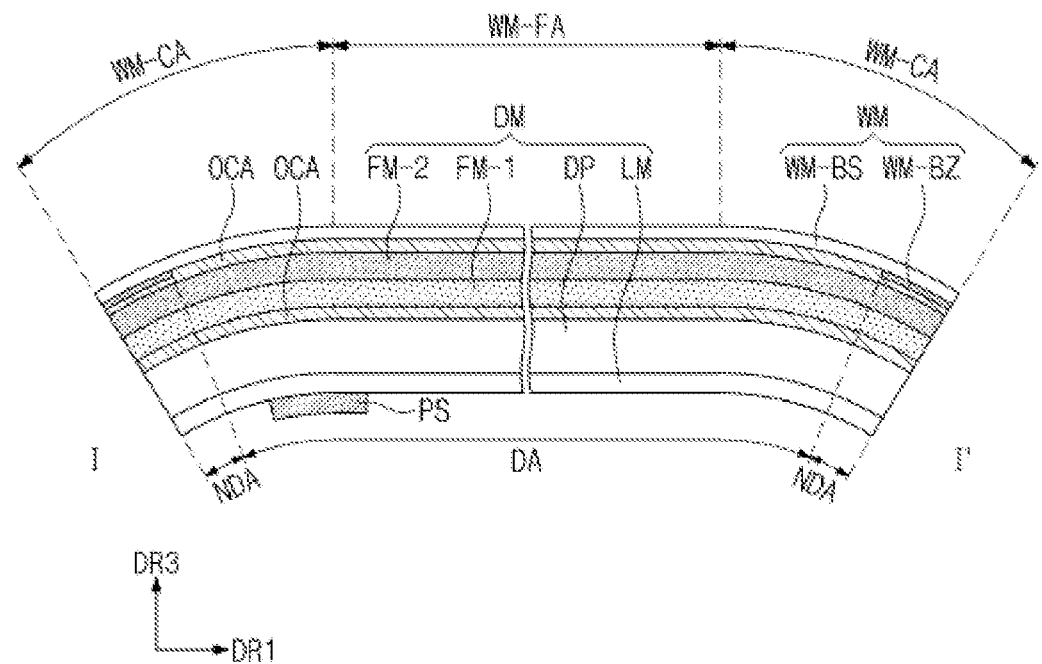

FIGS. 3A and 3B are cross-sectional views showing a display device DD according to an exemplary embodiment of the present disclosure. FIGS. 3A and 3B show a cross-section taken along a sectional line I-I' of FIG. 1B. Hereinafter, detailed descriptions on the same elements as those described with reference to FIGS. 1A, 1B, and 2 will be omitted.

Referring to FIGS. 3A and 3B, the display device DD includes the display panel DP, the input sensor FM-1, an optical film FM-2, the window WM, a protective panel LM, and the pressure sensor PS. In the exemplary embodiments, a stacking structure from the protective panel LM to the optical film FM-2 may be defined as the display module DM.

As shown in FIGS. 3A and 3B, the window WM and the optical film FM-2 may be attached to each other by an adhesive layer OCA. The adhesive layer OCA may be a pressure sensitive adhesive film, an optically clear adhesive film, or an optically clear resin.

The window WM includes a base substrate WM-BS and a bezel pattern WM-BZ. The base substrate WM-BS includes a transparent substrate such as a glass substrate, however, it should not be limited thereto or thereby. The base substrate WM-BS may include a plastic material. The base substrate WM-BS has a single-layer structure, however, it should not be limited thereto or thereby. The base substrate WM-BS may include a glass or plastic substrate and a polymer film attached to the glass or plastic substrate by an adhesive layer.

The bezel pattern WM-BZ may be directly disposed on a rear surface of the base substrate WM-BS. The bezel pattern WM-BZ may have a multi-layer structure of a colored layer and a black light blocking layer. The colored layer and the black light blocking layer may be formed through deposition, printing, or coating processes.

The window WM according to the exemplary embodiment of the present disclosure may further include a functional coating layer disposed on an entire surface of the base substrate WM-BS. The functional coating layer may include an anti-fingerprint layer, an anti-reflective layer, and a hard coating layer.

The window WM may include a flat area WM-FA and a curved area WM-CA. The curved area WM-CA may be an area bent from the flat area WM-FA. The curved area WM-CA may have a predetermined curvature. The curved area WM-CA may include a plurality of areas having different curvatures from each other.

The optical film FM-2 has a single-layer structure, however, the optical film FM-2 may have a multi-layer structure, and the multi-layer structure may include an adhesive layer. The optical film FM-2 may be attached to an upper surface of the input sensor FM-1 by the adhesive layer. The optical film FM-2 may include a polarizer and a retarder. The polarizer and the retarder may be a stretching type or a coating type.

The input sensor FM-1 shown in FIG. 3A may be directly disposed on a base surface provided by the display panel DP. In the present disclosure, the expression that component "B" is directly disposed on component "A" means that no intervening elements, such as an adhesive layer or a pressure sensitive adhesive layer, are present between the component "B" and the component "A". The component "B" is formed on a base surface provided by the component "A" through successive processes after the component "A" is formed.

As shown in FIG. 3B, the input sensor FM-1 may be coupled to the display panel DP after being separately manufactured. The adhesive layer OCA may be disposed between the input sensor FM-1 and the display panel DP. The input sensor FM-1 of a "panel type" shown in FIG. 3B may further include a base film as compared with the input sensor FM-1 of a "layer type" shown in FIG. 3A.

As shown in FIGS. 3A and 3B, the protective panel LM is disposed on a rear surface of the display panel DP to support the display panel DP. The protective panel LM may have a multi-layer structure. For instance, the protective panel LM may include a light blocking member and an elastic member. The light blocking member may prevent or suppress an external light from entering the display panel DP through the rear surface of the display panel DP. The light blocking member may be a black polymer film, e.g., a PET film.

The light blocking member may have a form of a double-sided adhesive tape that further includes an adhesive layer disposed on both sides thereof. Accordingly, the light blocking member has a function of the adhesive tape that adheres the elastic member to the rear surface of the display panel DP.

The elastic member absorbs external impacts to protect the display panel DP from the external impacts. The elastic member may include a foam polymer, for example, a foam urethane sheet. Further, the protective panel LM may further include a metal plate having a rigidity above a reference. The protective panel LM may be a stainless steel plate. In the exemplary embodiment of the present disclosure, the protective panel LM may be omitted.

As shown in FIGS. 3A and 3B, the pressure sensor PS may be disposed on a rear surface of the protective panel LM. The pressure sensor PS may be attached to the rear surface of the protective panel LM by an adhesive layer (not shown). The display panel DP, the input sensor FM-1, the optical film FM-2, and the protective panel LM may overlap with the flat area WM-FA and the curved area WM-CA. Since it is sufficient for the pressure sensor PS to overlap only with the pressure sensing area PSA (refer to FIGS. 1A and 1B), the pressure sensor PS has an area smaller than the display panel DP, the input sensor FM-1, the optical film FM-2, and the protective panel LM.

Figure 4A:
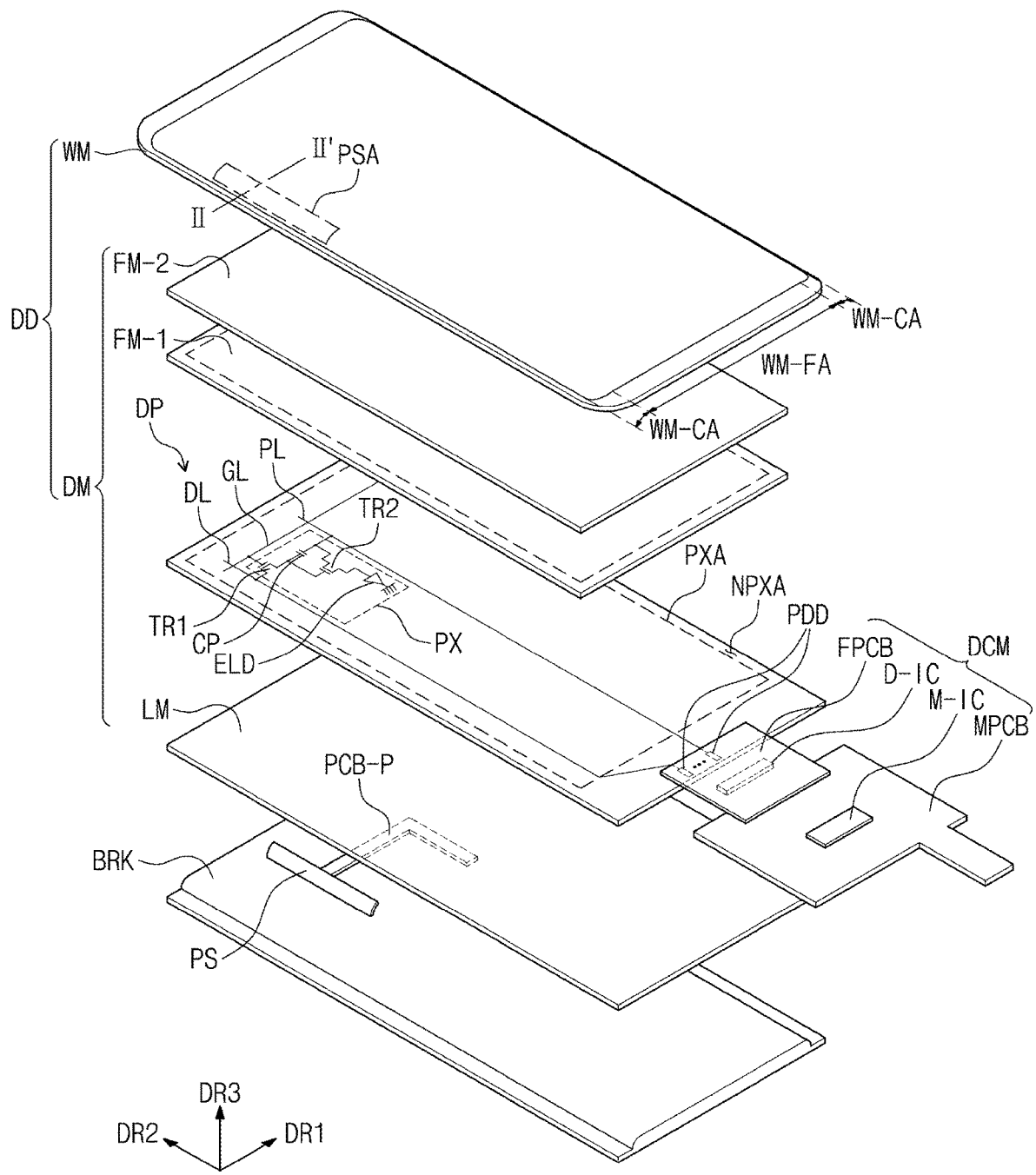
FIG. 4A is an exploded perspective view showing a display device according to an exemplary embodiment of the present disclosure.
Figure 4B:
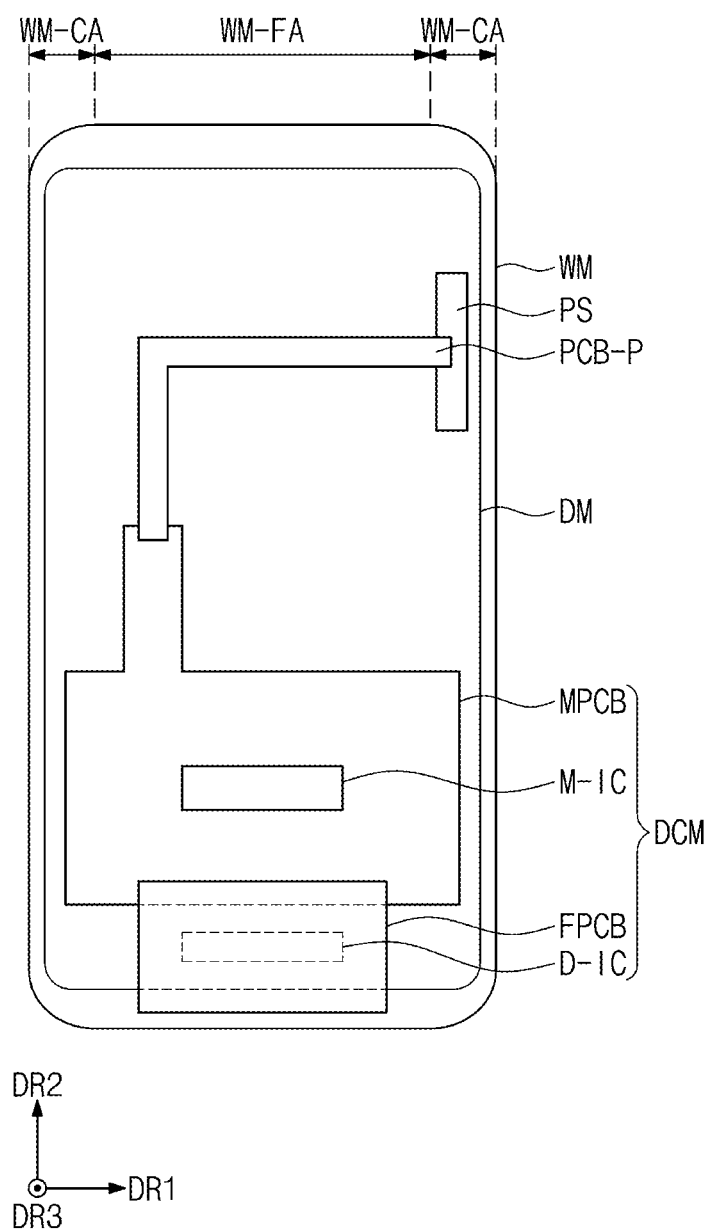
FIG. 4B is a rear view showing a display device according to an exemplary embodiment of the present disclosure.
Figure 4C:
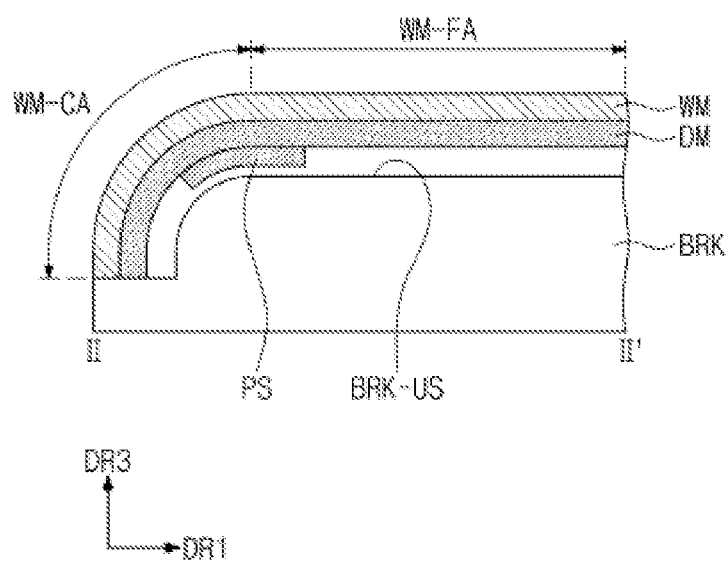
FIG. 4C is a cross-sectional view showing a display device according to an exemplary embodiment of the present disclosure.

FIG. 4A is an exploded perspective view showing a display device DD according to an exemplary embodiment of the present disclosure. FIG. 4B is a rear view showing the display device DD according to an exemplary embodiment of the present disclosure. FIG. 4C is a cross-sectional view showing the display device DD according to an exemplary embodiment of the present disclosure. In FIG. 4A, the adhesive layer OCA of FIGS. 3A and 3B are not shown. FIG. 4C shows the cross-sectional view taken along a sectional line II-II' of FIG. 4A.

In FIG. 4A, the display panel DP, the input sensor FM-1, and the optical film FM-2 are shown in a flat state before being coupled to the window WM. According to the exemplary embodiments, the display panel DP may be, but not limited to, an organic light emitting display panel. The display panel DP includes a pixel area PXA in which a pixel PX is disposed and a non-pixel area NPXA adjacent to the pixel area PXA when viewed in a plan view. The pixel PX is not disposed in the non-pixel area NPXA, and peripheral structures, such as signal lines and banks, are disposed in the non-pixel area NPXA. The pixel area PXA and the non-pixel area NPXA may respectively correspond to the display area DA (refer to FIGS. 1A and 1B) and the non-display area NDA (refer to FIGS. 1A and 1B). However, the corresponding regions (e.g., a shape or area) need not be completely identical.

The pixel PX is disposed in the pixel area PXA. The pixel PX is provided in plural number, and the pixels PX are respectively connected to the signal lines. The pixel PX includes a first thin film transistor TR1, a second thin film transistor TR2, a capacitor CP, and a light emitting device ELD.

The first thin film transistor TR1 is connected to a gate line GL and a data line DL. The light emitting device ELD receives a power voltage provided through the power line PL. Pads PDD connected to the signal lines, e.g., the data line DL and the power line PL, are disposed in the non-pixel area NPXA. The pads PDD may have an integral shape with the signal lines or may be disposed on a different layer from the signal lines and connected to ends of the signal lines via contact holes defined through the insulating layer.

A driving control module DCM includes a first circuit board FPCB connected to the display panel DP, a second circuit board MPCB connected to the first circuit board FPCB, a first driving chip D-IC mounted on the first circuit board FPCB, and a second driving chip M-IC mounted on the second circuit board MPCB. The first driving chip D-IC may provide a data signal and/or a gate signal to the display panel DP and may provide a control signal. The second driving chip M-IC may include a timing controller that converts an image signal to the data signal.

Although not shown separately, a plurality of passive devices and a plurality of active devices may be mounted on the second circuit board MPCB. A driving chip that controls the input sensor FM-1 and the pressure sensor PS may be mounted on the second circuit board MPCB. The second circuit board MPCB may be a rigid circuit board or a flexible circuit board, and the first circuit board FPCB may be a flexible circuit board. Although not shown separately, the second circuit board MPCB may be electrically connected to the mother board of the electronic module EM (refer to FIG. 1B) through a connector.

A circuit board may be further provided to connect the input sensor FM-1 and the second circuit board MPCB. A signal line of the input sensor FM-1 may be connected to the second circuit board MPCB through the first circuit board FPCB by connecting the display panel DP to the signal line. As the first circuit board FPCB is bent, the second circuit board MPCB may be disposed on a rear surface of the display module DM, i.e., the rear surface of the protective panel LM.

As shown in FIGS. 4A and 4B, the pressure sensor PS disposed on the rear surface of the protective panel LM may be connected to the second circuit board MPCB through a third circuit board PCB-P. The pressure sensor PS and the second circuit board MPCB may be connected to each other via a connector.

As shown in FIG. 4C, the pressure sensor PS is spaced apart from an upper surface BRK-US of the bracket BRK in a state in which the bracket BRK is coupled to the display module DM and/or the window WM. A distance between a rear surface of the pressure sensor PS and the upper surface BRK-US of the bracket BRK may be in a range from a tens of micrometers to hundreds of micrometers. The distance between the rear surface of the pressure sensor PS and the upper surface BRK-US of the bracket BRK may be in a range from about 50 μm to about 300 μm. The distance between the rear surface of the pressure sensor PS and the upper surface BRK-US of the bracket BRK may be about 100 μm and may have an error of +/−10%.

Since the pressure sensor PS is spaced apart from the upper surface BRK-US of the bracket BRK, a defect in which the bracket BRK presses the pressure sensor PS does not occur in the assembling process. Accordingly, the pressure sensor PS may be prevented or suppressed from malfunctioning.

The pressure sensor PS may overlap with the flat area WM-FA and the curved area WM-CA. The pressure sensor PS may replace an input key module of the electronic device. When the user presses the flat area WM-FA or the curved area WM-CA of the window, the electronic device may recognize the pressing operation by the user as the user's input.

Figure 5A:
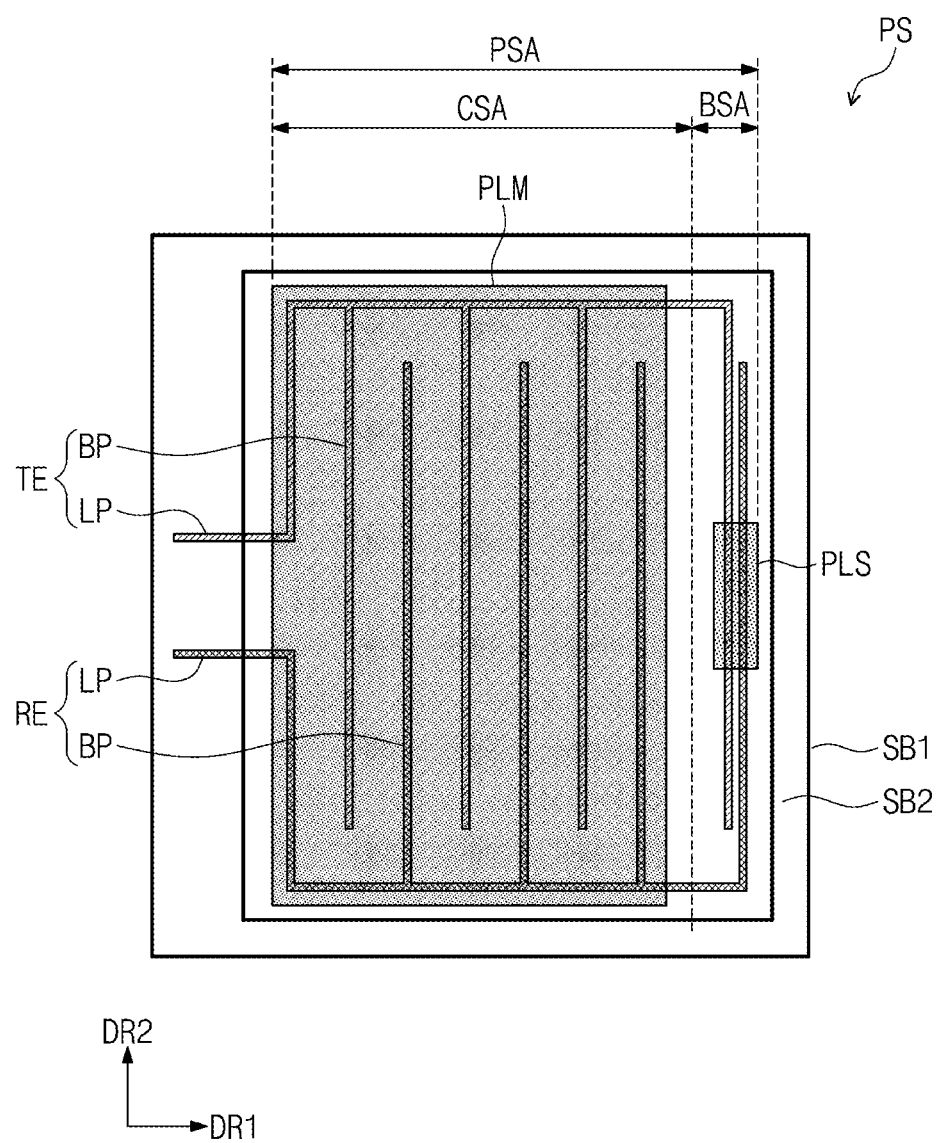
FIG. 5A is a plan view showing a pressure sensor according to an exemplary embodiment of the present disclosure.
Figure 5B:
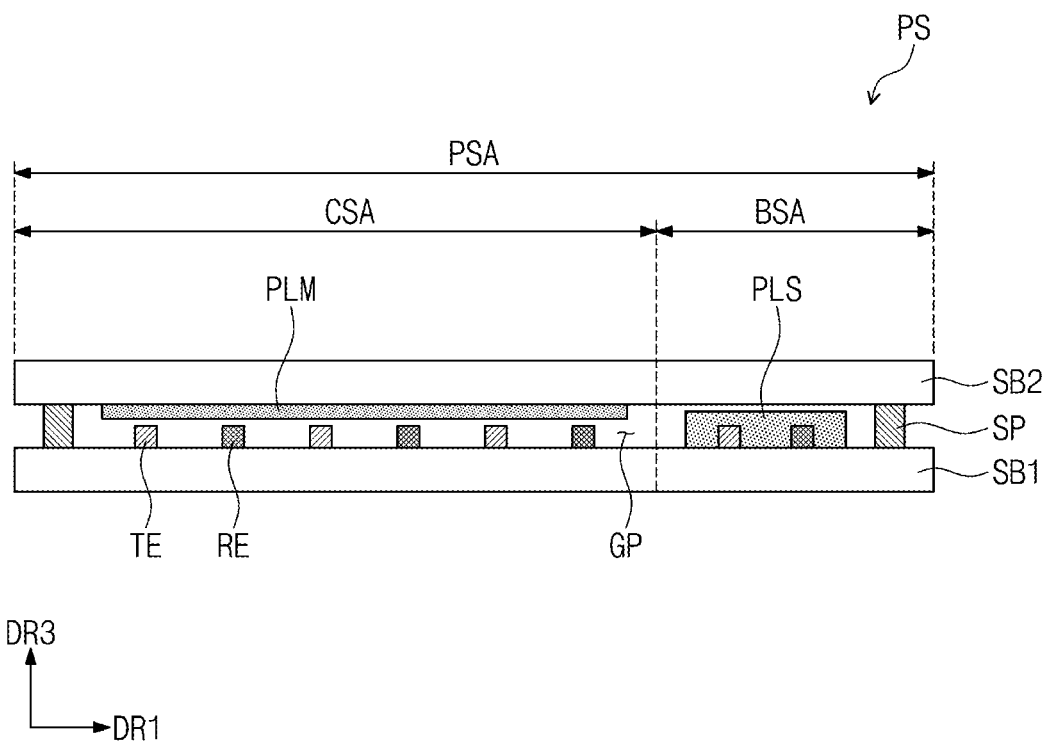
FIG. 5B is a cross-sectional view showing a pressure sensor according to an exemplary embodiment of the present disclosure.
Figure 5C:
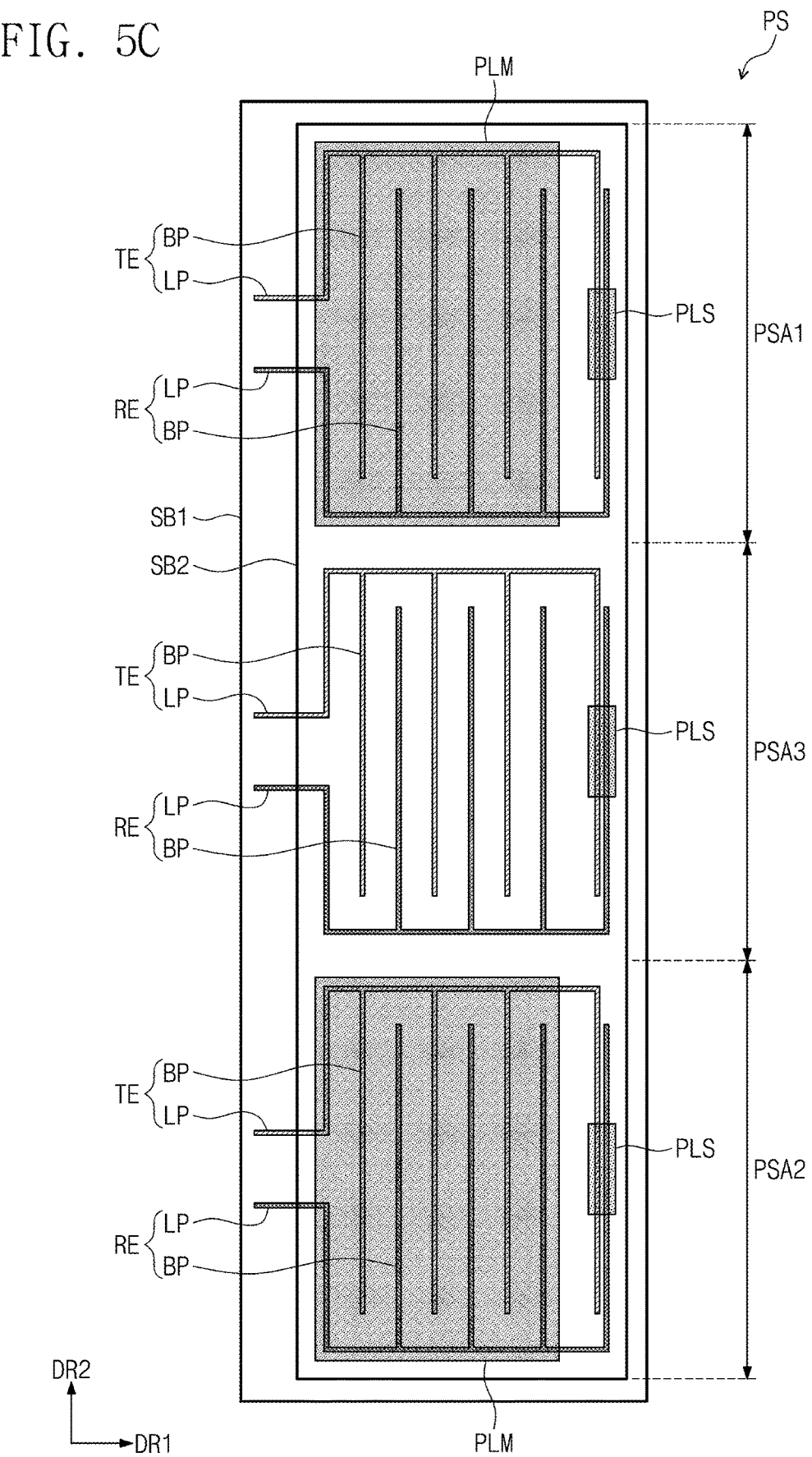
FIG. 5C is a plan view showing a pressure sensor according to an exemplary embodiment of the present disclosure.
Figure 6A:
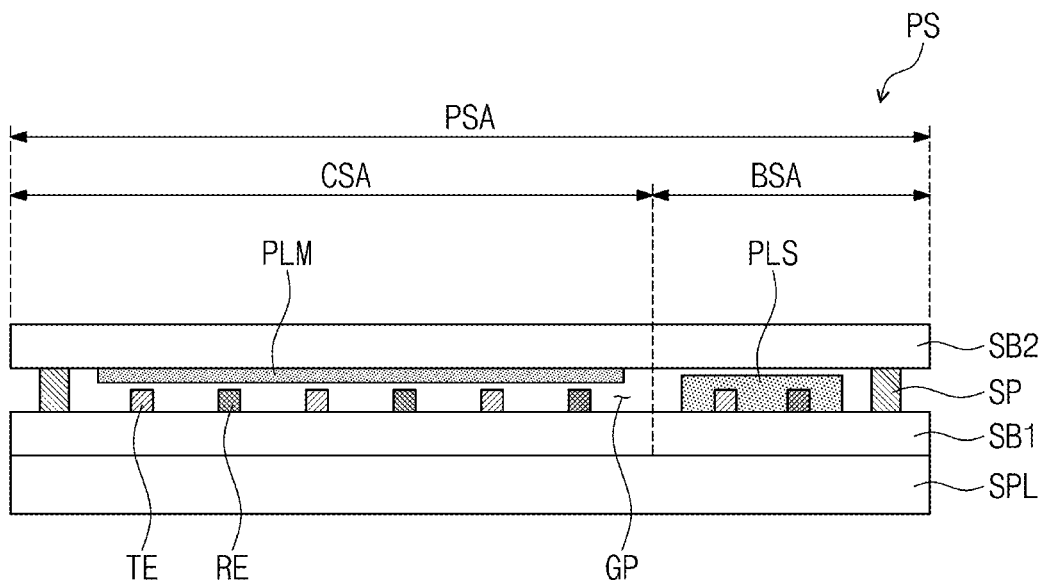
FIG. 6A is a cross-sectional view showing a pressure sensor according to an exemplary embodiment of the present disclosure.
Figure 6B:
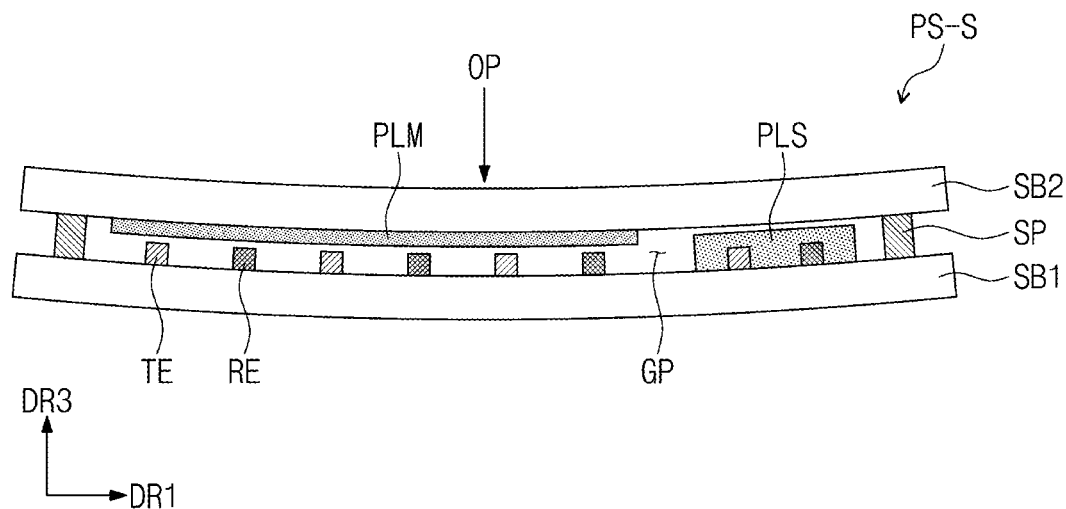
FIGS. 6B and 6C are cross-sectional views showing pressure sensors according to an exemplary embodiment of the present disclosure.
Figure 6C:
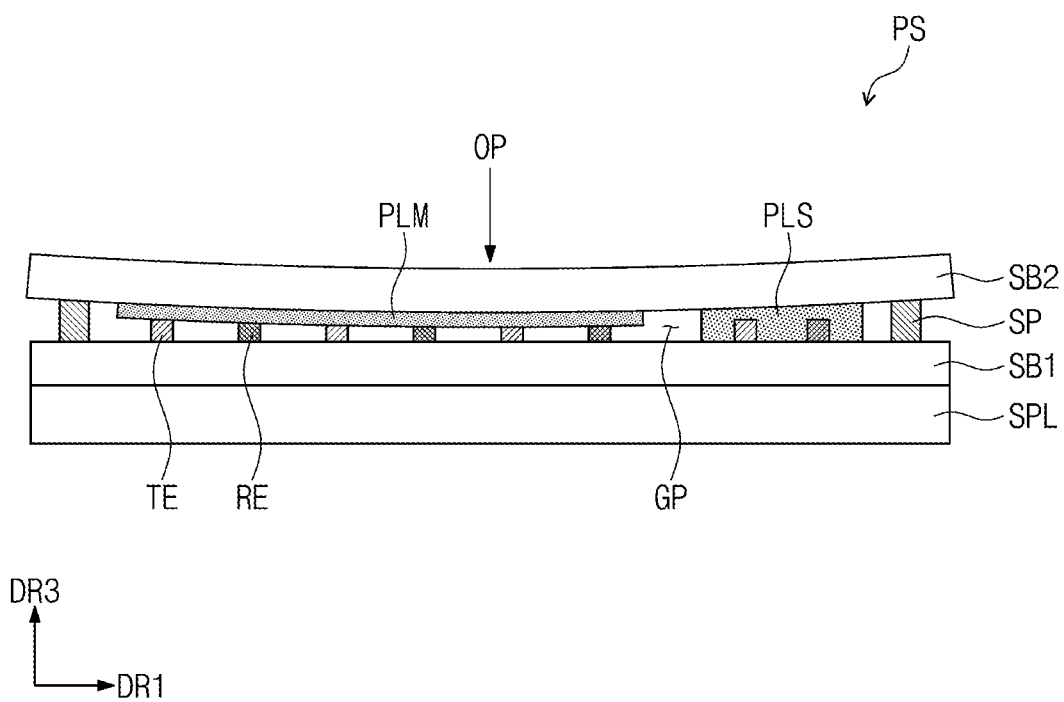

FIG. 5A is a plan view showing a pressure sensor PS according to an exemplary embodiment of the present disclosure. FIG. 5B is a cross-sectional view showing a pressure sensor PS according to an exemplary embodiment of the present disclosure. FIG. 5C is a plan view showing a pressure sensor PS according to an exemplary embodiment of the present disclosure. FIG. 6A is a cross-sectional view showing a pressure sensor PS according to an exemplary embodiment of the present disclosure. FIGS. 6B and 6C are cross-sectional views showing pressure sensors PS-S, PS according to an exemplary embodiment of the present disclosure.

Referring to FIGS. 5A and 5B, the pressure sensor PS includes a first base layer SB1, a second base layer SB2 defining a gap GP with the first base layer SB1, first and second electrodes TE and RE disposed on an inner surface of the first base layer SB1 or an inner surface of the second base layer SB2, and a sensing layer PLM disposed between the first base layer SB1 and the second base layer SB2. The inner surface of the first base layer SB1 and the inner surface of the second base layer SB2 face each other. The pressure sensor PS may further include a sealing member SP to seal the gap GP. The sealing member SP may be an organic adhesive member or an inorganic adhesive member.

Each of the first base layer SB1 and the second base layer SB2 may be a polymer film, e.g., a polyimide film, a polyamide film, or a polyethylene terephthalate film. Each of the first base layer SB1 and the second base layer SB2 may have a single-layer structure of polyethylene terephthalate film.

The first electrode TE and the second electrode RE may include a metal pattern or a transparent conductive oxide. In the exemplary embodiments, the first electrode TE and the second electrode RE are disposed on an upper surface of the first base layer SB1, however, they should not be limited thereto or thereby. In the exemplary embodiments, the first electrode TE and the second electrode RE may be formed by the same process and may include the same material. In the exemplary embodiment of the present disclosure, one electrode of the first electrode TE and the second electrode RE may be disposed on an upper surface of the first base layer SB1, and the other electrode of the first electrode TE and the second electrode RE may be disposed on lower surface of the second base layer SB2.

Each of the first electrode TE and the second electrode RE may be divided into plural portions. Each of the first electrode TE and the second electrode RE may include a line portion LP and a plurality of branch portions BP.

The line portion LP of each of the first electrode TE and the second electrode RE is disposed outside the pressure sensor PS when viewed in a plan view. The line portion LP of the first electrode TE and the line portion LP of the second electrode RE may face each other in one direction. In the exemplary embodiments, the one direction is the second direction DR2. The branch portions BP of each of the first electrode TE and the second electrode RE extend from a corresponding line portion LP of the line portions LP. The branch portions BP of the first electrode TE are alternately arranged with the branch portions BP of the second electrode RE along a direction different from and crossing the one direction. An end of the line portion LP of each of the first electrode TE and the second electrode RE may be connected to the third circuit board PCB-P (refer to FIG. 4B).

The sensing layer PLM may include a quantum tunneling composite (QTC). The sensing layer PLM may include a base resin and conductive particles mixed with the base resin. The base resin may include a polymer, and the conductive particles may include titanium particles or nickel particles.

The sensing layer PLM may be spaced apart from at least one of the first electrode TE and the second electrode RE in a state in which no external pressure is applied. In the exemplary embodiments, the sensing layer PLM disposed on the lower surface of the second base layer SB2 and spaced apart from the first electrode TE and the second electrode RE is shown.

The pressure sensing area PSA corresponding to the pressure sensor PS may include a first sensing area CSA and a second sensing area BSA. The first sensing area CSA may be defined as an area in which the sensing layer PLM is disposed. The first sensing area CSA may have an area larger than an area of the second sensing area BSA.

The second sensing area BSA may be defined as an area in which a sub-sensing layer PLS is disposed. The sub-sensing layer PLS may make contact with the first electrode TE and the second electrode RE. The sub-sensing layer PLS may include a conductive material or the quantum tunneling composite (QTC).

In a case where the pressure is applied from the outside, the sensing layer PLM makes contact with the first and second electrodes TE and RE. Accordingly, a resistance value (hereinafter, referred to as a "measured resistance value") formed by the first electrode TE, the second electrode RE, and the sensing layer PLM is changed. The driving chip (or pressure sensing circuit) senses the change of the measured resistance value to determine whether the pressure is applied.

Although the pressure is not applied from the outside, the first electrode TE and the second electrode RE may be electrically connected to each other by the sub-sensing layer PLS. Therefore, the driving chip may sense a resistance value (hereinafter, referred to as an "initial resistance value") formed by the first electrode TE, the second electrode RE, and the sub-sensing layer PLS. The driving chip senses the initial resistance value to determine whether the first and second electrodes TE and RE are damaged, i.e., whether a disconnection occurs between the first and second electrodes TE and RE. In detail, when the initial resistance value is measured within a predetermined range, the driving chip determines that the disconnection does not occur, and when the initial resistance value is measured at infinity or above the predetermined value, the driving chip determines that the disconnection occurs. The pressure sensor PS according to the exemplary embodiment of the present disclosure may not include the second sensing area BSA.

FIG. 5C shows a pressure sensor PS different from the pressure sensor PS shown in FIGS. 5A and 5B. As shown in FIG. 5C, the pressure sensor PS includes a first pressure sensing area PSA1, a second pressure sensing area PSA2, and a temperature compensation area PSA3 disposed between the first pressure sensing area PSA1 and the second pressure sensing area PSA2. The first pressure sensing area PSA1 and the second pressure sensing area PSA2 may be substantially the same as the pressure sensing area PSA shown in FIGS. 5A and 5B.

The first electrode TE and the second electrode RE are disposed in the temperature compensation area PSA3, however, the sensing layer PLM is not disposed in the temperature compensation area PSA3. The sub-sensing layer PLS may be disposed in the temperature compensation area PSA3.

The measured resistance value described with reference to FIGS. 5A and 5B may be affected not only by the external pressure but also by the external temperature. Referring to FIG. 5C, since the sensing layer PLM is not disposed in the temperature compensation area PSA3, the measured resistance value affected only by the temperature may be calculated. The measured resistance value affected only by the external pressure may be accurately calculated by comparing the measured resistance value calculated from the first pressure sensing area PSA1 and the second pressure sensing area PSA2 with the measured resistance value calculated from the temperature compensation area PSA3.

The pressure sensor PS shown in FIG. 6A may be supported by a support layer SPL as compared with the pressure sensor PS described with reference to FIGS. 5A and 5B. Although not shown separately, the pressure sensor PS according to the exemplary embodiment of the present disclosure may further include the support layer SPL as compared with the pressure sensor PS shown in FIG. 5C.

The support layer SPL has a Young's modulus greater than that of the pressure sensor PS described with reference to FIGS. 5A and 5B. The support layer SPL may have a more rigid property than the pressure sensor PS described with reference to FIGS. 5A and 5B. The support layer SPL may have a Young's modulus greater than that of the first base layer SB1 or the second base layer SB2.

The support layer SPL may have a multi-layer structure. The support layer SPL may include a plurality of stacked prepreg layers. The prepreg layers may refer to a structure including a thermosetting resin layer and a reinforcing fiber impregnated in the thermosetting resin layer. In addition, the support layer SPL may include a metal material and a synthetic resin.

The support layer SPL may have a Young's modulus four times greater than that of the first base layer SB1. The first base layer SB1 of the PET film may have a Young's modulus of about 4 GPa, and the support layer SPL of the prepreg layer may have a Young's modulus of about 18 GPa to about 22 GPa.

The support layer SPL may have an elongation (or a stretch ratio) smaller than that of the first base layer SB1. The support layer SPL of the prepreg layer may have the elongation corresponding to about 1/60 to about 1/34 of elongation of the first base layer SB1 of the PET film.

The support layer SPL may have a flexural strength greater than that of the first base layer SB1. The support layer SPL of the prepreg layer may have the flexural strength three times greater than that of the first base layer SB1 of the PET film.

As shown in FIG. 6B, a pressure sensor PS-S having a small Young's modulus may be bent together with the first base layer SB1 and the second base layer SB2 when an external pressure OP is applied to the pressure sensor PS-S. The sensing layer PLM may be applied with a small force relative to the applied pressure. This phenomenon may easily occur in the structure in which the upper surface of the bracket BRK is spaced apart from other components. In this case, the driving chip may calculate that a pressure lower than the actual pressure applied to the sensing layer PLM. This calculation may cause errors in the input.

As shown in FIG. 6C, when the external pressure OP is applied, the support layer SPL supports the pressure sensor PS to suppress the bending of the pressure sensor PS. Accordingly, a force corresponding to the applied pressure may be applied to the sensing layer PLM. As the support layer SPL supports the pressure sensor PS, a fine user input may be sensed.

Figure 7A:
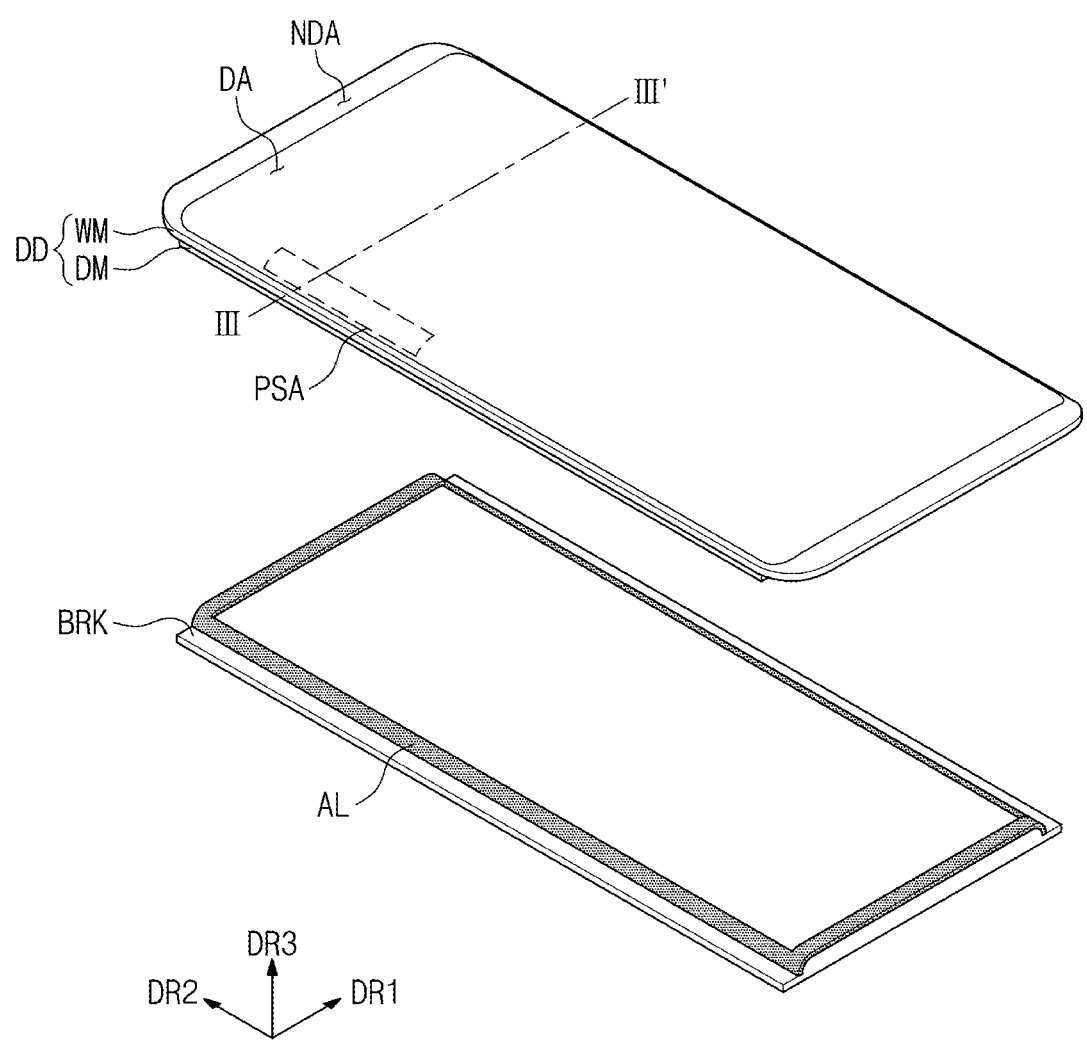
FIG. 7A is an exploded perspective view showing an electronic device according to an exemplary embodiment of the present disclosure.

FIG. 7A is an exploded perspective view showing an electronic device ED according to an exemplary embodiment of the present disclosure. FIGS. 7B, 7C, 7D, 7E, 7F, and 7G are cross-sectional views respectively showing electronic devices ED according to an exemplary embodiment of the present disclosure. Hereinafter, detailed descriptions on the same elements as those described with reference to FIGS. 1A, 1B, 2, 3A, 3B, 4A, 4B, 4C, 5A, 5B, 5C, 6A, 6B, and 6C will be omitted.

According to the exemplary embodiments, the electronic device ED may further include an adhesive tape AL overlapping with the curved area WM-CA and coupling the bracket BRK and the display module DM. The adhesive tape AL may be attached to the lower surface of the protective panel LM shown in FIG. 4A.

The adhesive tape AL may couple the bracket BRK and the window WM. The adhesive tape AL may prevent or suppress external moisture from penetrating into a gap between the bracket BRK and the display module DM.

The adhesive tape AL may be disposed along an edge of the display module DM or an edge of the window WM. The adhesive tape AL may be provided in one body or may include plural separated parts.

Figure 7B:
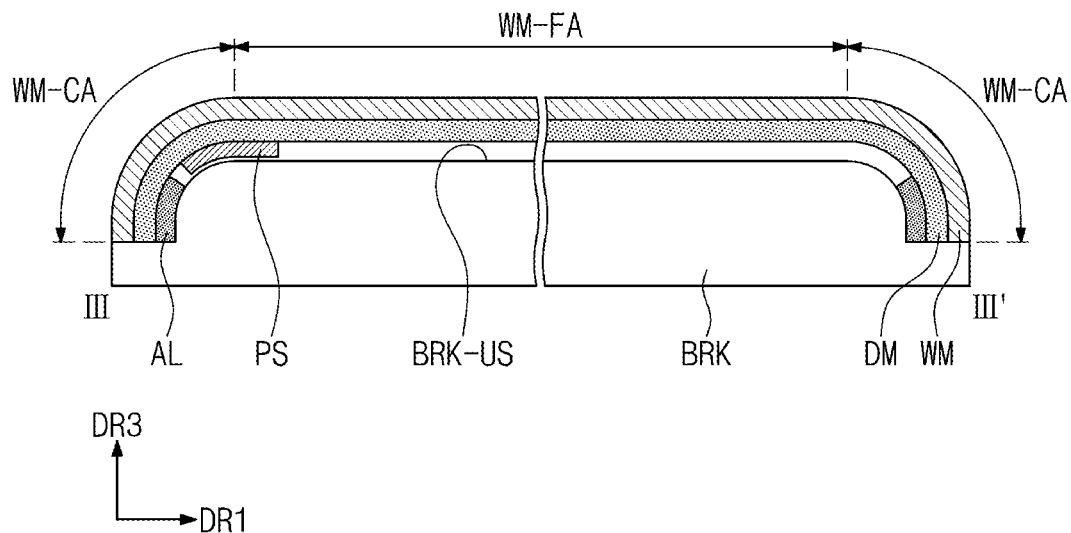
FIGS. 7B, 7C, 7D, 7E, 7F, and 7G are cross-sectional views respectively showing electronic devices according to an exemplary embodiment of the present disclosure.

As shown in FIG. 7B, the pressure sensor PS is disposed more adjacent to, or closer to, a center of the window WM than the adhesive tape AL. The pressure sensor PS is disposed inside the adhesive tape AL when viewed in a plan view. The pressure sensor PS is disposed spaced apart from the adhesive tape AL. The pressure sensor PS does not overlap with the adhesive tape AL.

Figure 7C:
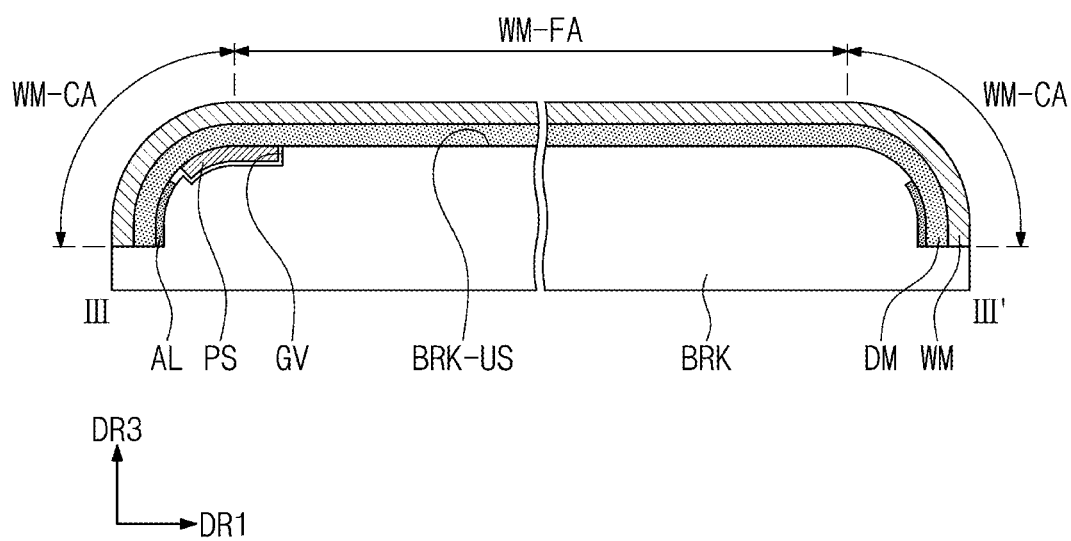

As shown in FIG. 7C, a concave portion GV may be defined in the bracket BRK to correspond to the pressure sensor PS. The concave portion GV may overlap with the pressure sensor PS. The pressure sensor PS may be disposed inside the concave portion GV when viewed in a plan view.

In this case, an upper surface BRK-US of the bracket BRK may directly support the display module DM. The pressure sensor PS inserted into the concave portion GV may be spaced apart from an upper surface of the concave portion GV. In this case, the adhesive tape may have a thickness smaller than a thickness of the pressure sensor PS.

Figure 7D:
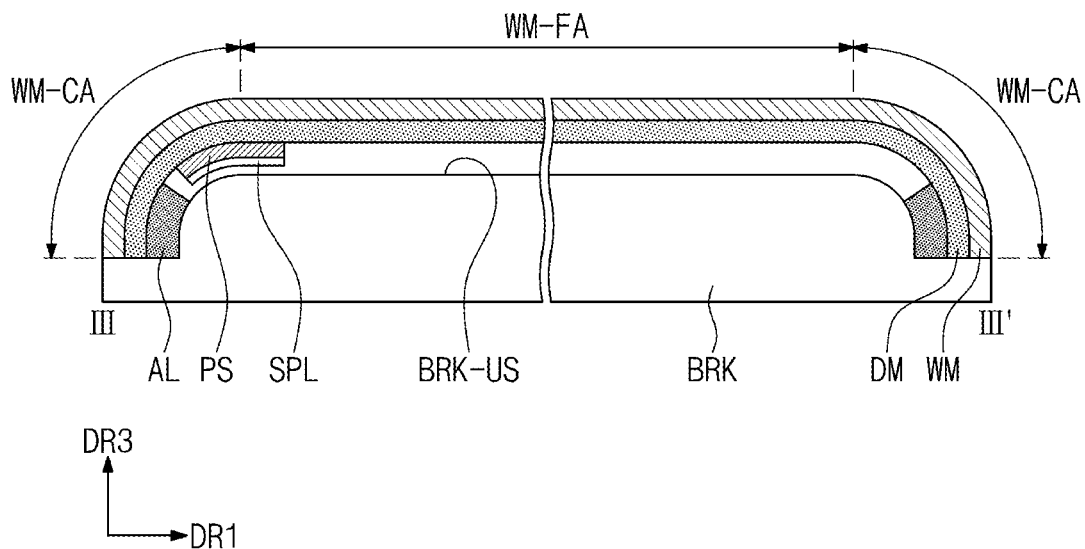
Figure 7E:
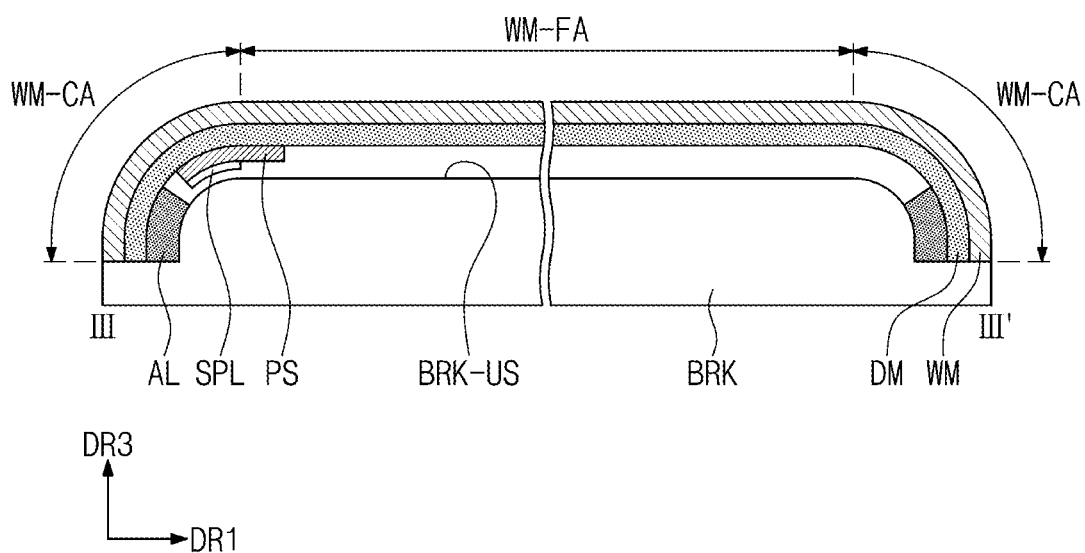
Figure 7F:
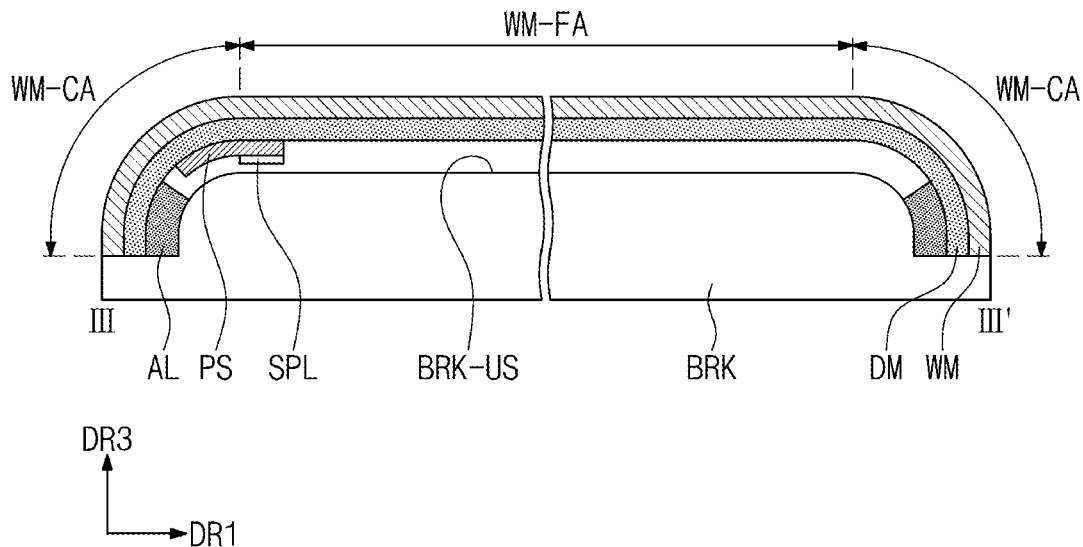
Figure 7G:
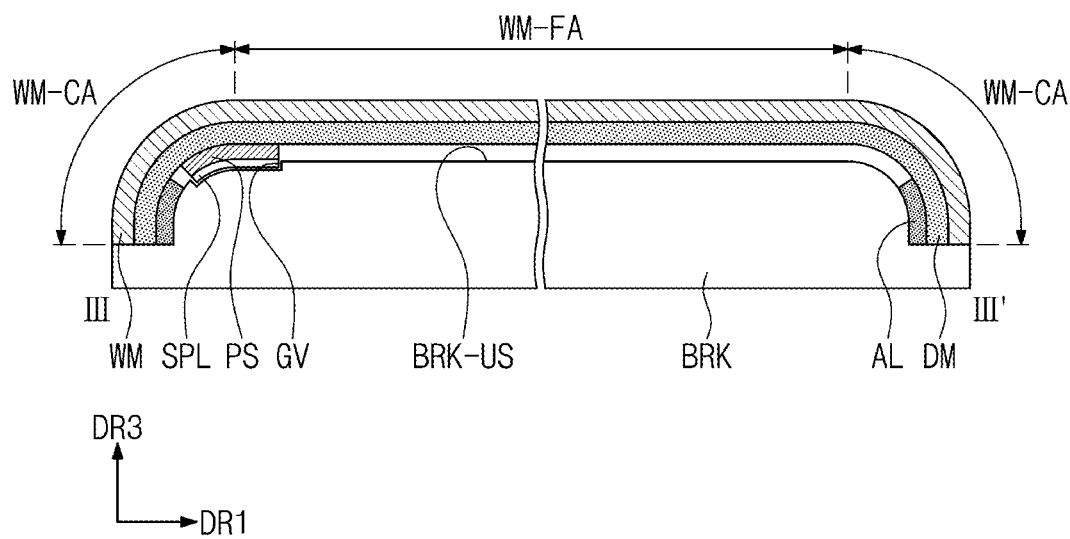

As shown in FIG. 7D, a support layer SPL may overlap with the flat area WM-FA and the curved area WM-CA of the window WM. As shown in FIG. 7E, a support layer SPL may overlap with only the curved area WM-CA of the window WM. As shown in FIG. 7F, a support layer SPL may overlap with only the flat area WM-FA of the window WM. As shown in FIG. 7G, a support layer SPL may be inserted into the concave portion GV.

Figure 8:
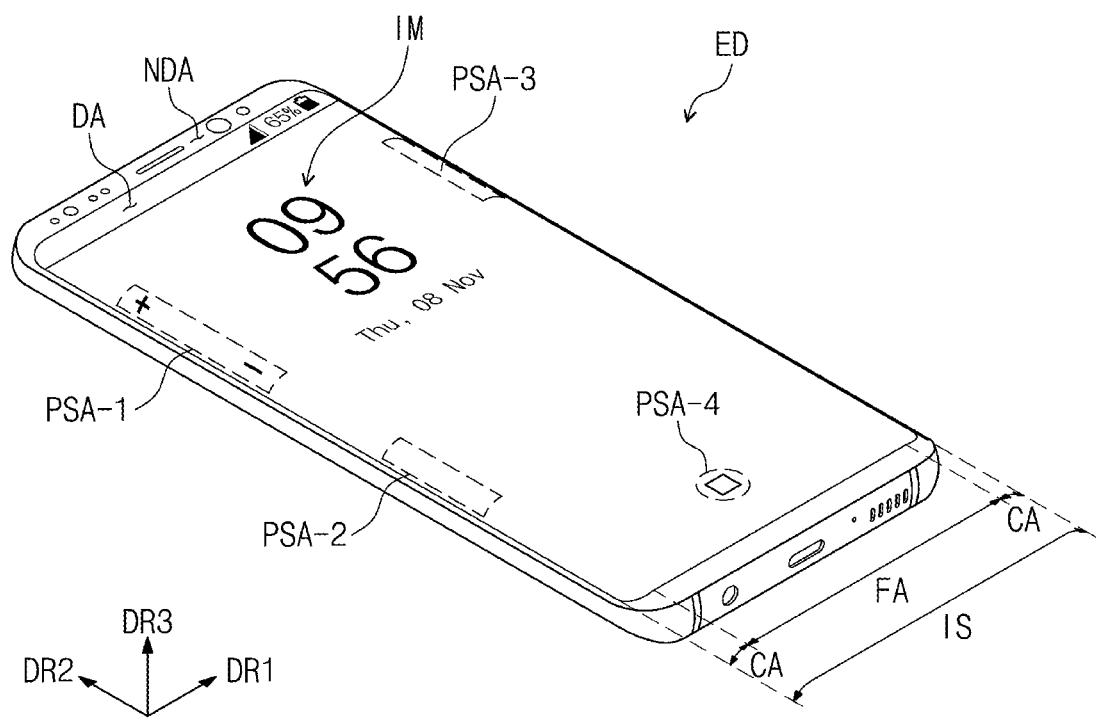
FIG. 8 is a perspective view showing an electronic device according to an exemplary embodiment of the present disclosure.

FIG. 8 is a perspective view showing an electronic device ED according to an exemplary embodiment of the present disclosure. FIG. 8 shows the smartphone as a representative example.

Referring to FIG. 8, the electronic device ED may include a plurality of pressure sensing areas PSA-1, PSA-2, PSA-3, and PSA-4 spaced apart from each other. The pressure sensing area PSA-1 disposed at a first position may replace a volume key of the smartphone. The pressure sensing area PSA-2 disposed at a second position may replace a function key of the smartphone. The function key may be a key used to execute a specific application. The pressure sensing area PSA-3 disposed at a third position may replace a power key of the smartphone. The pressure sensing area PSA-4 disposed at a fourth position may have a home button function of the smartphone.

The pressure sensor PS is disposed under the display module DM to correspond to each of the pressure sensing areas PSA-1, PSA-2, PSA-3, and PSA-4. The two-channel type pressure sensor PS described with reference to FIG. 5C may be disposed in the pressure sensing area PSA-1 disposed at the first position. The one-channel type pressure sensor PS described with reference to FIGS. 5A and 5B may be disposed in the pressure sensing areas PSA-2, PSA-3, and PSA-4 respectively disposed at the second, third, and fourth positions.

Figure 9A:
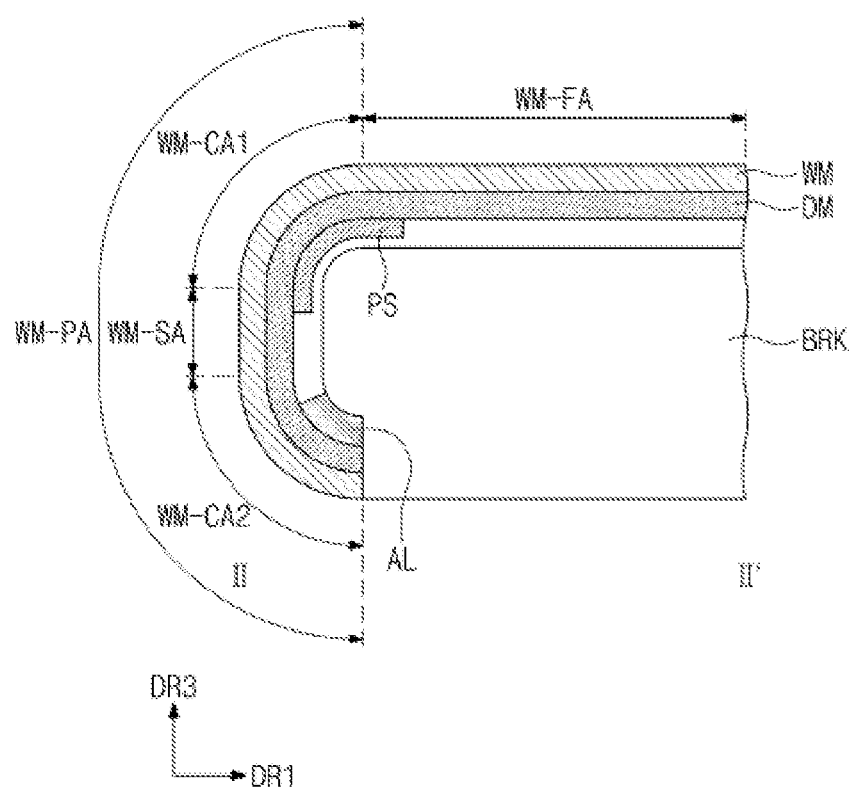
FIGS. 9A and 9B are cross-sectional views respectively showing display devices according to an exemplary embodiment of the present disclosure.
Figure 9B:
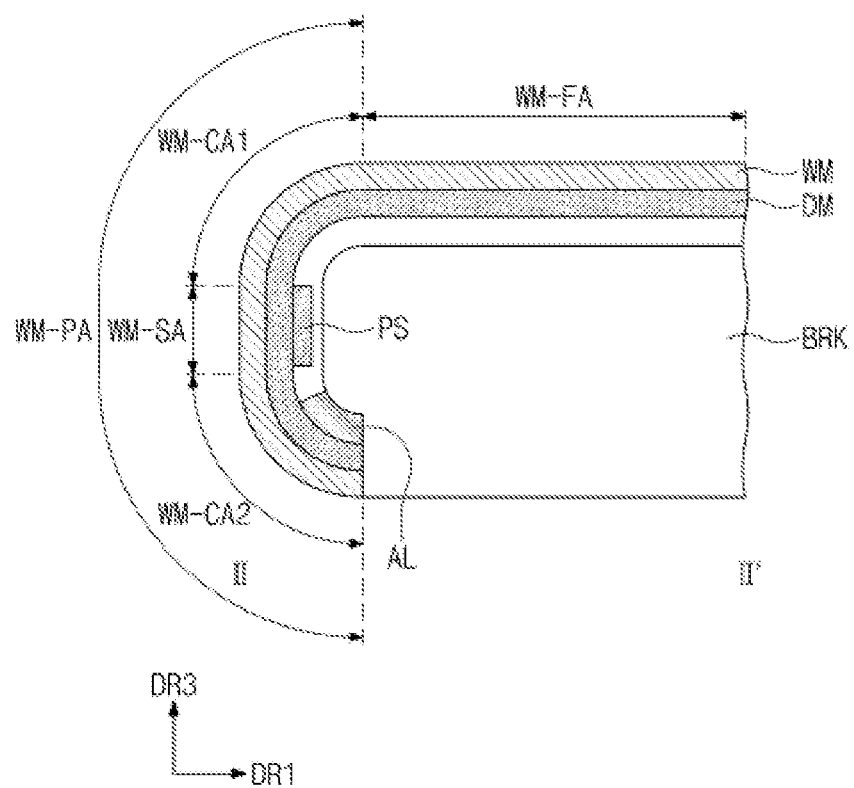

FIGS. 9A and 9B are cross-sectional views respectively showing display devices DD according to an exemplary embodiment of the present disclosure. FIGS. 9A and 9B show the cross-section corresponding to FIG. 4C.

The window WM includes a flat area WM-FA and a peripheral area WM-PA extending from the flat area WM-FA. The peripheral area WM-PA includes a first curved area WM-CA1 extending from the flat area WM-FA, a side area WM-SA extending from the first curved area WM-CA1, and a second curved area WM-CA2 extending from the side area WM-SA. According to an exemplary embodiment, the second curved area WM-CA2 may be omitted.

The display module DM overlaps with the flat area WM-FA and the peripheral area WM-PA. The display module DM may overlap with at least the first curved area WM-CA1 and the side area WM-SA. The display module DM may overlap with the second curved area WM-CA2.

The pressure sensor PS is attached to the lower surface of the display module DM. As shown in FIG. 9A, the pressure sensor PS may be disposed to overlap with the flat area WM-FA, the first curved area WM-CA1, and the side area WM-SA. As shown in FIG. 9B, the pressure sensor PS may be disposed to overlap with only the side area WM-SA.

In the exemplary embodiments, the electronic device ED to which the adhesive tape AL is attached is shown, however, the adhesive tape AL may be omitted. The concave portion GV (refer to FIG. 7A) may be defined in the bracket BRK, and the support layer SPL (refer to FIG. 6A) may be further disposed below the pressure sensor PS.

According to the above, the pressure sensor may replace an input key module of the electronic device. When the user presses the flat surface or curved surface of the window, the electronic device may recognize the user's operation as a user's input.

The pressure sensor is disposed to be spaced apart from the bracket, and thus a defect in which the bracket presses the pressure sensor during an assembling process may be prevented or suppressed. Therefore, the pressure sensor may be prevented or suppressed from malfunctioning.

Since the support layer supports the pressure sensor, a fine user input may be sensed. The support layer may prevent or suppress the entire pressure sensor spaced apart from the bracket from being curved.

Although the exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed.

Therefore, the disclosed subject matter should not be limited to any single embodiment described herein, and the scope of the present inventive concept shall be determined according to the attached claims.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An electronic device comprising:
a window comprising a flat area and a curved area;
a display module disposed on a lower surface of the window to overlap with the flat area and the curved area;
a pressure sensor disposed on a lower surface of the display module to overlap with the curved area; and
a bracket disposed on the lower surface of the display module and coupled to at least one of the window and the display module, wherein the pressure sensor is disposed between the window and the bracket,
wherein:
the lower surface of the window and the lower surface of the display module face the same direction;
a portion of the lower surface of the display module is exposed from the pressure sensor; and
a gap is defined between the portion of the lower surface of the display module and the bracket.

2. The electronic device of claim 1, wherein the pressure sensor further overlaps with the flat area.

3. The electronic device of claim 1, further comprising an adhesive tape that overlaps with the curved area, the adhesive tape coupling the bracket and the display module to each other.

4. The electronic device of claim 3, wherein the pressure sensor is disposed more adjacent to a center of the window than the adhesive tape.

5. The electronic device of claim 4, wherein the pressure sensor overlaps with at least a portion of the curved area, overlaps with at least a portion of the flat area, and overlaps with at least a portion of the display module, and the pressure sensor is spaced apart from the adhesive tape in a plan view.

6. The electronic device of claim 3, wherein the display module comprises:
an optical film;
an input sensor disposed under the optical film;
a display panel disposed under the input sensor; and
a protective panel disposed under the display panel, and the adhesive tape is coupled to the protective panel.

7. The electronic device of claim 1, wherein a concave portion is defined in the bracket corresponding to the pressure sensor.

8. The electronic device of claim 7, further comprising an adhesive tape that overlaps with the curved area, the adhesive tape coupling the bracket and the display module to each other, wherein the adhesive tape has a thickness smaller than a thickness of the pressure sensor.

9. The electronic device of claim 1, wherein the pressure sensor comprises:
a first base layer;
a second base layer defining a gap with the first base layer;
a first electrode disposed on an inner surface of the first base layer or an inner surface of the second base layer;
a second electrode disposed on the inner surface of the first base layer or the inner surface of the second base layer; and
a sensing layer comprising a base resin and a conductive particle mixed with the base resin,
wherein the inner surface of the first base layer and the inner surface of the second base layer face each other.

10. The electronic device of claim 1, wherein the pressure sensor comprises:
a first electrode disposed in each of a first pressure sensing area, a second pressure sensing area, and a temperature compensation area disposed between the first pressure sensing area and the second pressure sensing area;
a second electrode disposed in each of the first pressure sensing area, the second pressure sensing area, and the temperature compensation area; and
a sensing layer disposed in each of the first pressure sensing area and the second pressure sensing area to be spaced apart from at least one of the first electrode and the second electrode and not disposed in the temperature compensation area.

11. The electronic device of claim 10, further comprising a sub-sensing layer that is disposed in each of the first pressure sensing area, the second pressure sensing area, and the temperature compensation area, the sub-sensing layer contacting the first electrode and the second electrode.

12. An electronic device comprising:
a window comprising a first area and a second area disposed outside the first area;
a display module disposed on a lower surface of the window to overlap with the first area and the second area;
a pressure sensor disposed on a lower surface of the display module to overlap with at least the second area;
a support layer disposed on a lower surface of the pressure sensor; and
a bracket disposed on the lower surface of the display module and coupled to at least one of the window and the display module,
wherein the support layer is spaced apart from an upper surface of the bracket.

13. The electronic device of claim 12, further comprising a bracket disposed on a lower surface of the display module and coupled to at least one of the window and the display module, wherein the support layer is disposed between an upper surface of the bracket and the lower surface of the display module.

14. The electronic device of claim 13, further comprising an adhesive tape that overlaps with the second area, the adhesive tape coupling the bracket and the display module to each other.

15. The electronic device of claim 13, wherein a concave portion is defined in the bracket corresponding to the support layer.

16. The electronic device of claim 15, wherein the support layer is inserted into the concave portion.

17. The electronic device of claim 12, wherein the second area comprises a curved area extending from the first area and a side area extending from the curved area, and the pressure sensor is disposed in at least the side area.

18. The electronic device of claim 12, wherein the pressure sensor comprises:

a first base layer;

a second base layer defining a gap with the first base layer;

a first electrode disposed on an inner surface of the first base layer or an inner surface of the second base layer;

a second electrode disposed on the inner surface of the first base layer or the inner surface of the second base layer; and a sensing layer comprising a quantum tunneling composite, wherein the inner surface of the first base layer and the inner surface of the second base layer face each other.

19. The electronic device of claim 18, wherein the support layer has a Young's modulus greater than a Young's modulus of the first base layer.

20. The electronic device of claim 18, wherein the first base layer comprises a single polymer film.

21. The electronic device of claim 18, wherein the support layer comprise a plurality of stacked prepreg layers.

* * * * *